(12) United States Patent
Wu et al.

(10) Patent No.: US 8,435,436 B2
(45) Date of Patent: May 7, 2013

(54) METHOD FOR FORMING TAIL FIN OF WIND TURBINE

(75) Inventors: Chih-Hsien Wu, Hsin-Tien (TW); Yi-Feng Tsai, Fengshan (TW)

(73) Assignee: Digisine Energytech Co., Ltd., Taipei Hsien (TW)

( * ) Notice: Subject to any disclaimer, the term of this patent is extended or adjusted under 35 U.S.C. 154(b) by 352 days.

(21) Appl. No.: 12/769,624

(22) Filed: Apr. 28, 2010

(65) Prior Publication Data
US 2011/0266712 A1    Nov. 3, 2011

(51) Int. Cl.
*B28B 1/20* (2006.01)
(52) U.S. Cl.
USPC .......... 264/311; 264/45.7; 264/503; 264/310; 264/312; 425/435
(58) Field of Classification Search ................. 264/47.5, 264/503, 310, 311, 45.7, 312; 425/435
See application file for complete search history.

(56) References Cited

U.S. PATENT DOCUMENTS
3,875,275 A * 4/1975 Lemelson ..................... 264/310

FOREIGN PATENT DOCUMENTS
JP      63280869 A  * 11/1988

OTHER PUBLICATIONS

English translation of JP 63280869, USPTO Translation Branch, Oct. 2012.*

* cited by examiner

*Primary Examiner* — Timothy Kennedy
(74) *Attorney, Agent, or Firm* — Leong C. Lei

(57) ABSTRACT

A method for forming a tail fin of wind turbine includes first pouring a proper amount of molten plastic into a mold having a cavity showing a contour of the tail fin and the mold is rotated to induce a centrifugal force that makes the plastic uniformly sticking to an inside surface of the cavity to form a tail fin that shows an aerodynamic feature of a one-piece hollow shell. The tail fin, when mounted to the wind turbine, realizes efficient and stable control of rotor blades at a front end of the nacelle in alignment with windward direction so as to improve the use of wind power and make the tail fin and the rotor blades in a weight balanced condition to thereby reduce the load applied to a yaw bearing located under the nacelle and extend the service life of the bearing.

3 Claims, 5 Drawing Sheets

METHOD FOR FORMING TAIL FIN OF WIND TURBINE

TECHNICAL FIELD OF THE INVENTION

The present invention generally relates to a method for forming a tail fin that has an aerodynamic feature and a light-weight construction of one-piece hollow shell and is particularly applicable to a wind turbine.

DESCRIPTION OF THE PRIOR ART

Electricity is one of the vital power sources of modern living and working. With the raised concern of environmental protection, more and more attempts have been made to use sustainable or renewable energies from the surroundings, such as wind energy, hydraulic energy, and solar energy, to support the consumption of electricity of the modern society. Among these renewable energy sources, wind power can be easily retrieved and can never be exhausted. A regular windmill or wind turbine uses wind power to drive the rotation of rotor blades by which the wind power drives a dynamo to convert the wind power into electrical power for subsequent use.

In the operation of the windmill or wind turbine, the rotor blades must be kept in a windward direction to ensure the retrieval of the maximum amount of power from the winds through the rotor blades. The direction of the rotor blades can be controlled in either an active manner or a passive manner. The active direction control comprises a wind direction detector mounted on the wind turbine and a motor based direction change system is provided to change the direction of the wind turbine based on the result of detection. This installation is complicated and thus expensive and is only fit for large-sized wind turbines. The passive direction control is often adopted by small-sized wind turbines, in which a tail fin is provided to automatically adjust the direction of the rotor blades to be in alignment with the wind direction so as to extract the maximum amount of wind power. Conventional tail fins are made of a zinc-coated steel plate that is erected on a tail portion of the wind turbine or made of plastics in the form of a thin plate mounted to the nacelle of the wind turbine.

The conventional tail fin can effectively change the direction of the wind turbine to accommodate the variation of incoming direction of winds. However, the conventional tail fin is of a structure having a single vertical surface, leading to slow response to the change of wind direction and is thus only fit for areas where winds are generally stable. A wind turbine carrying such a tail fin, when subjected to side gusts, often yaws following the gusts, leading to undesired deviation from the general windward direction, as a consequence of which, the rotational speed of the rotor blades may be lowered or even get stagnated. This problem significantly affects the overall performance of the wind turbine.

Further, the application of the wind turbine is getting wider and is commonly accepted by the general consumers. Thus, more and more sets of wind turbine of this kind are installed in the surrounding of a society or living site, including street lamp, garden landscape, and roof of building. These installation sites are often found in an urban area where shielding is found everywhere. Since winds moving through an urban area are subjected to blocking by the urban shielding, the winds of urban area are generally unstable and full of strong turbulences. Due to such a unique environmental factor, the conventional tail fin structure provided for wind turbines is not suitable in an urban area and performance of wind turbine may easily get worse due to the unique wind field in the urban area.

In view of such problems, it is desired to provide a tail fin that is suitable for all kinds of wind field and wind flow and feature light weight to ensure full development of the performance of a wind turbine.

SUMMARY OF THE INVENTION

The primary objective of the present invention is to provide a method for forming a tail fin of wind turbine that shows an aerodynamic feature in order to correctly and stably control the alignment of rotor blades of the wind turbine in a windward direction for enhancing the use of wind power and full development of the performance of the wind turbine.

Another objective of the present invention is to provide a method for forming a tail fin for wind turbine, which shows a light-weighted configuration with weights of front and rear halves of the nacelle of the wind turbine substantially balanced in order to reduce the loading of yaw bearings located under the nacelle and to improve the performance and service life of the bearings.

To achieve the above objectives, the present invention provides a method for forming a tail fin of wind turbine, wherein a mold is machined to form a mold cavity that carries a contour corresponding to a tail fin configuration having aerodynamic feature. A sprue is formed in a preset location of the mold cavity and extends to the outside. A proper amount of molten plastic is filled into the cavity of the mold and rotation of the mold is performed to cause the molten plastic to stick to an inside surface of the mold cavity by centrifugal force until the plastic is cooled down and set. The mold is then opened for removal the molded part out of the mold, whereby a tail fin that shows an aerodynamic outer contour and is made a one-piece hollow member is obtained to be used in a wind turbine. The tail fin that is of such a light-weighted configuration can then be mounted to a tail end of a nacelle of the wind turbine whereby the one-piece tail fin and the rotor blades at the front end of the nacelle are of a weight balanced arrangement. In this way, loading applied to a yaw bearing mounted under the nacelle can be reduced and the performance for yawing and the service life of the bearing are improved. In addition, proper, efficient, and stable alignment of the rotor blades at the front end of the nacelle with windward direction can be realized to ensure the best performance for extracting the maximum amount of wind power.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
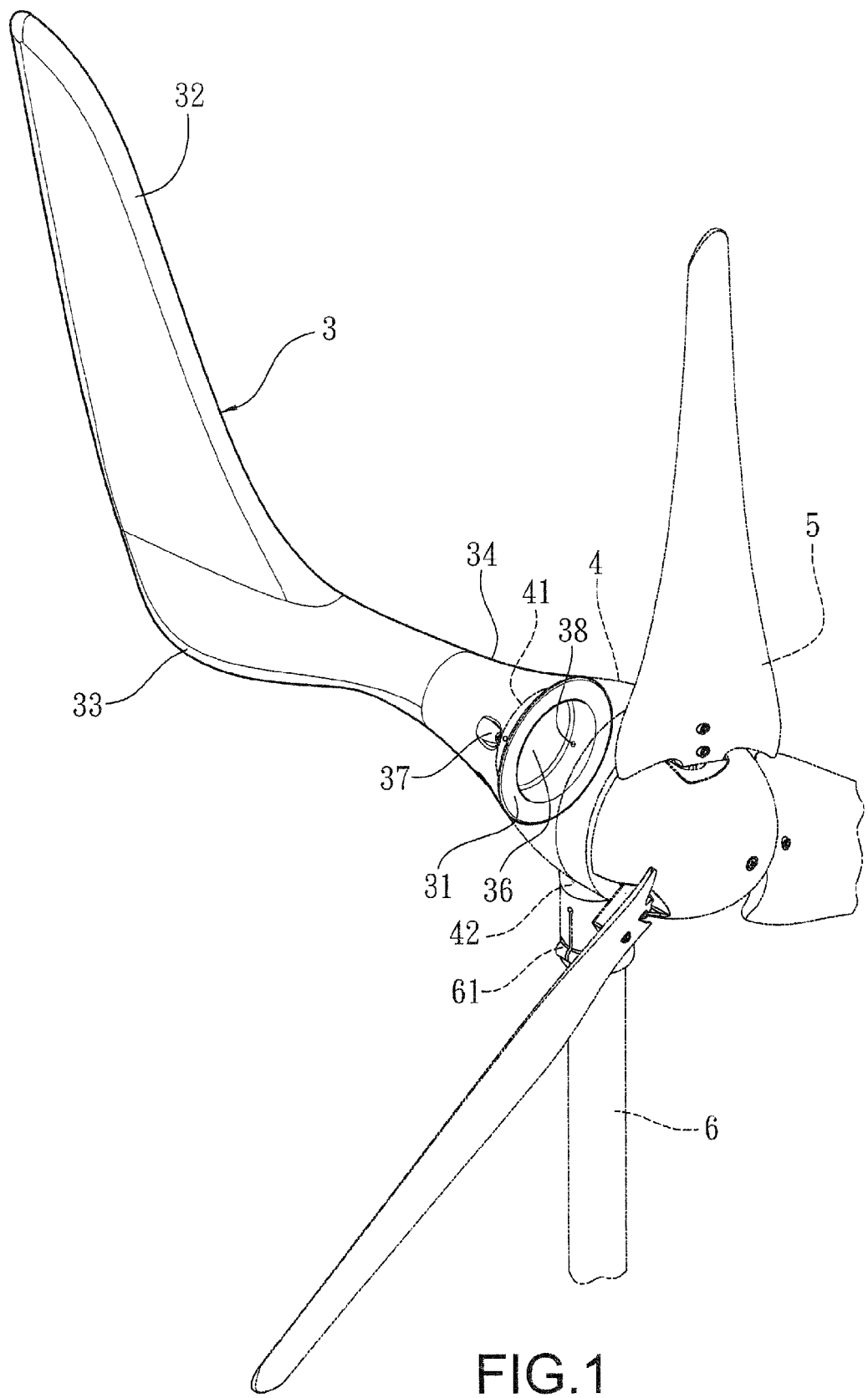
FIG. 1 is a perspective view showing a practical application of the present invention.
Figure 2:
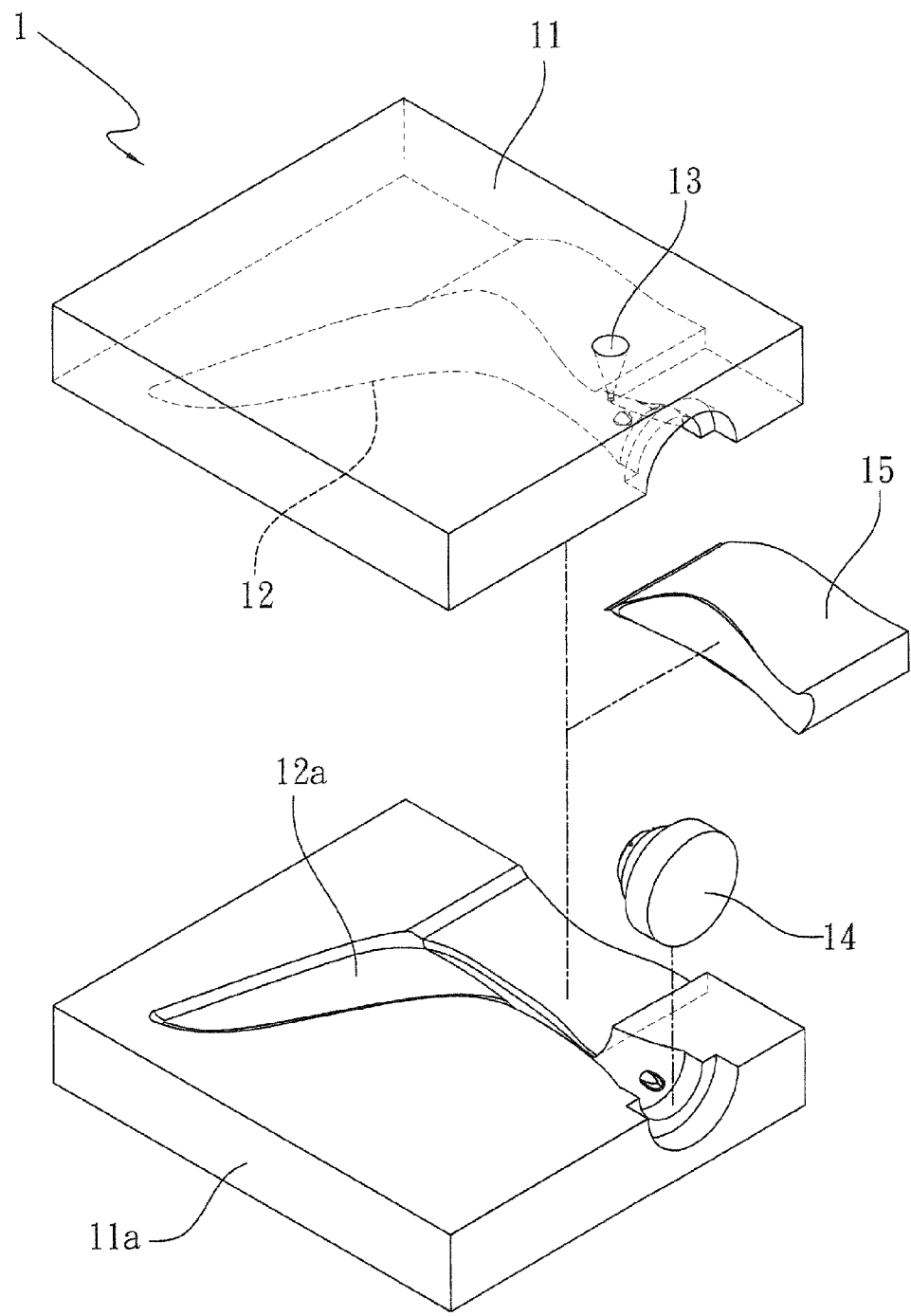
FIG. 2 is an exploded view illustrating making of a mold according to the present invention.
Figure 3:
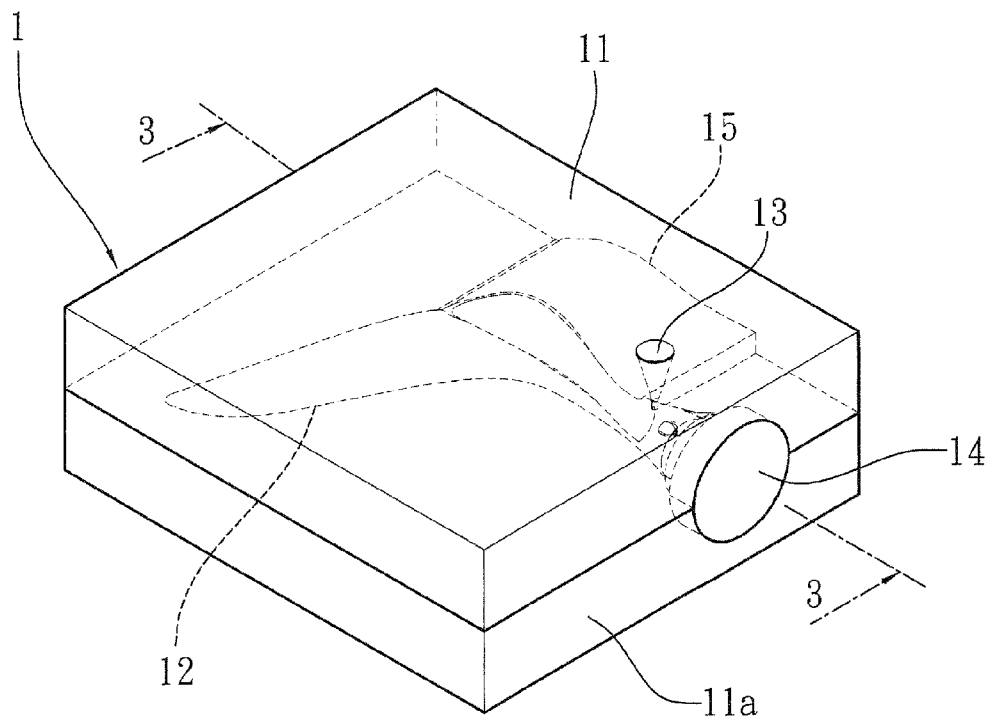
FIG. 3 is a perspective view showing the mold of the present invention in an assembled form.
Figure 4:
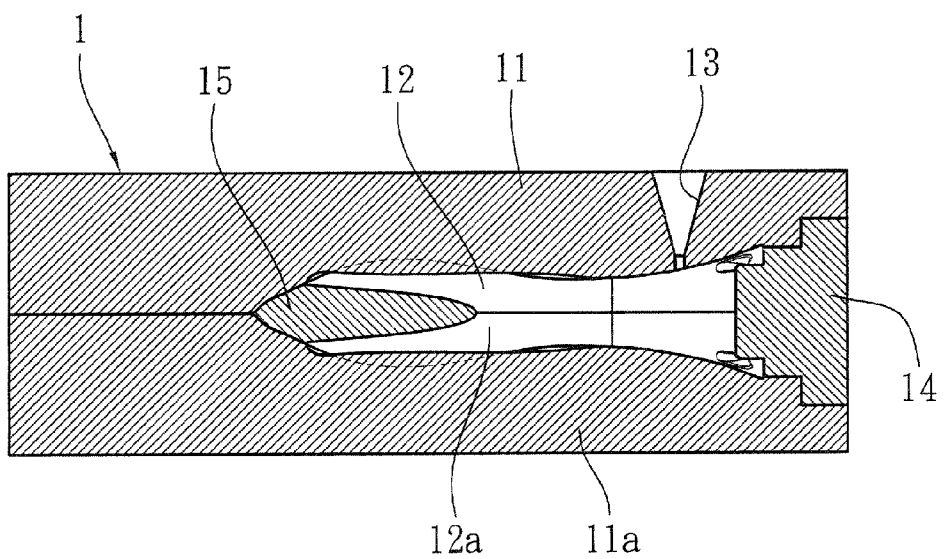
FIG. 4 is a cross-sectional view of FIG. 2.
Figure 5:
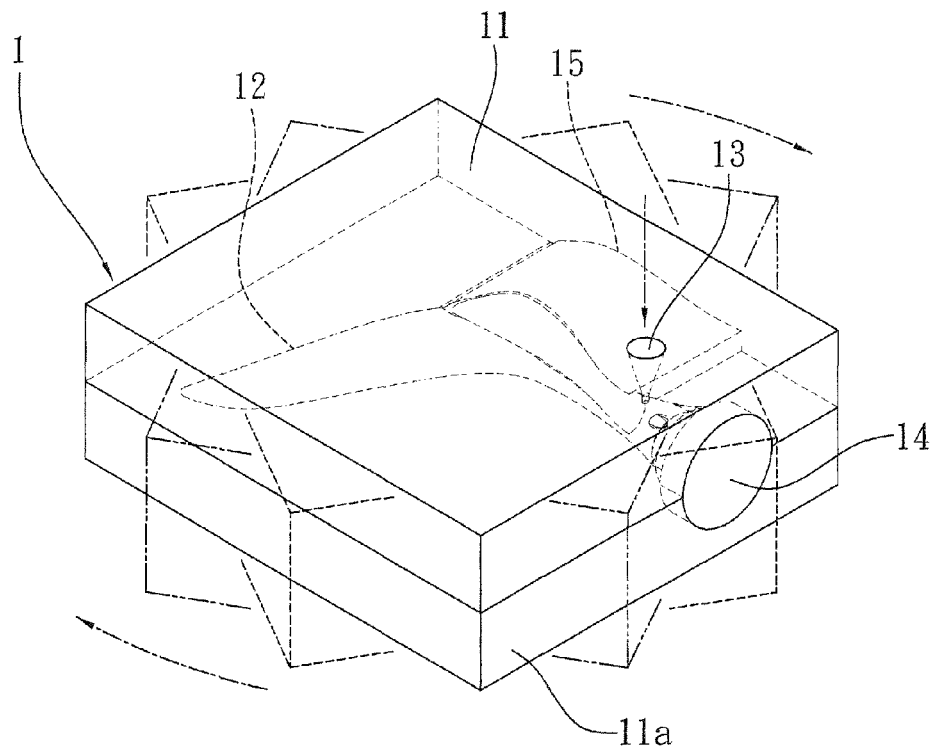
FIG. 5 is a perspective view illustrating a molding process according to the present invention.
Figure 7:
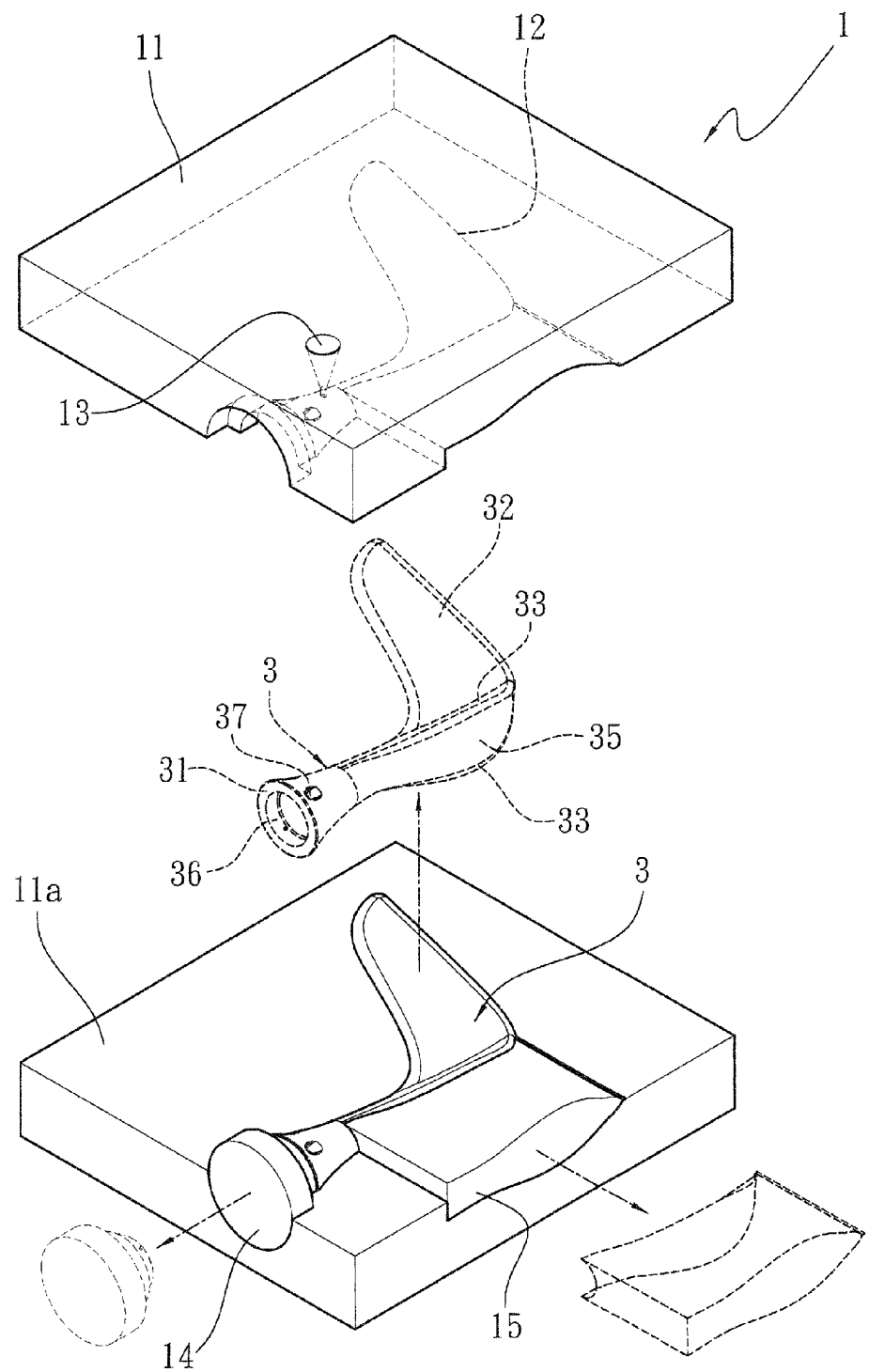
FIG. 7 is a perspective view illustrating a setting and mold release step of the molding process of the present invention.

Referring to FIGS. 1 and 7, the present invention provides a method for forming a tail fin of wind turbine, comprising the steps of "mold making", "injection molding", and "setting and mold release", by which a one-piece tail fin, generally designated at 3, showing an aerodynamic contour is formed. In a preferred embodiment of the present invention, the tail fin 3 comprises a structure shown in FIG. 1, having a front end forming a coupling section 31 and a rear end which comprises an erected primary fin member 32 vertically mounted thereto and a secondary side fin member 33 extending from each of two sides of the primary fin member 32. The tail fin 3 comprises a narrow section 34 behind the coupling section 31. The narrow section 34 has an outer contour that is continuously and smoothly jointed to the primary fin member 32 and side fin members 33. The tail fin 3 has a bottom which forms a smooth curved channel 35 (see FIG. 7) at the junction between the two side fin members 33 to thereby form a tail fin of aerodynamic streamlining contour. The coupling section 31 forms therein a recess 36 that is delimited by a circumferential surrounding wall in which a plurality of slots 37 is defined. Each of the slots 37 forms therein a fastening hole 38 that extends through the wall to communicate the recess 36. With this arrangement, the tail fin 3 of the present invention can be secured to a coupling section 41 at a rear end of a nacelle 4 of the wind turbine by bolts in a weight balanced arrangement with respect to rotor blades 5 set at the front end of the nacelle. The nacelle 4 is provided, at the bottom thereof, with a rotational axle 42 that is rotatably coupled to a bearing (not shown in the drawings) set in an upper-end joint 61 of a turbine support post 6 to provide a rotational axis about which the nacelle is rotatable for adjusting the alignment of the rotor blades 5 with respect to the windward direction through the air stream guiding feature provided by the tail fin 3, so as to extract the maximum amount of wind power. Further, the nacelle 4 contains therein a dynamo set (not shown in the drawings) that is in coupling with the rotor blades 5 for conversion of the kinetic energy of the rotation of the blades 5 into electrical power for output.

Referring to FIGS. 2-7, the steps of mold making, injection molding, and setting and mold release of the method according to the present invention will be described as follows.

(A) Mold making, in which a mold 1 that is proper machined to correspond to the contour of the tail fin 3. In the instant embodiment, the mold 1 is composed of upper and lower mold blocks 11, 11a. The mold blocks 11, 11a each form a mold cavity 12, 12a according to a parting line for molding the tail fin 3. One of mold cavities, such as cavity 12, is provided with a sprue 13 that extends to the outside of the mold block 11. The mold 1 also comprises an insert 14 that is detachably set in a location corresponding to the coupling section 31 of the tail fin 3 to form the recess 36 defined in the coupling section 31 and the slots 37 defined in the circumferential wall of the recess 36 with the fastening holes 38 defined in the slots 37. The mold 1 further comprises another insert 15 that is detachably set at a location corresponding to the junction between the two side fin members 33 on the bottom of the tail fin 3 in order to form the curved channel 35 in the bottom junction of the two side fin members 33 (see FIG. 6). The mold blocks 11, 11a and the inserts 14, 15 are assembled together to form the mold 1 (see FIGS. 2-4) for forming the tail fin 3.

Figure 6:
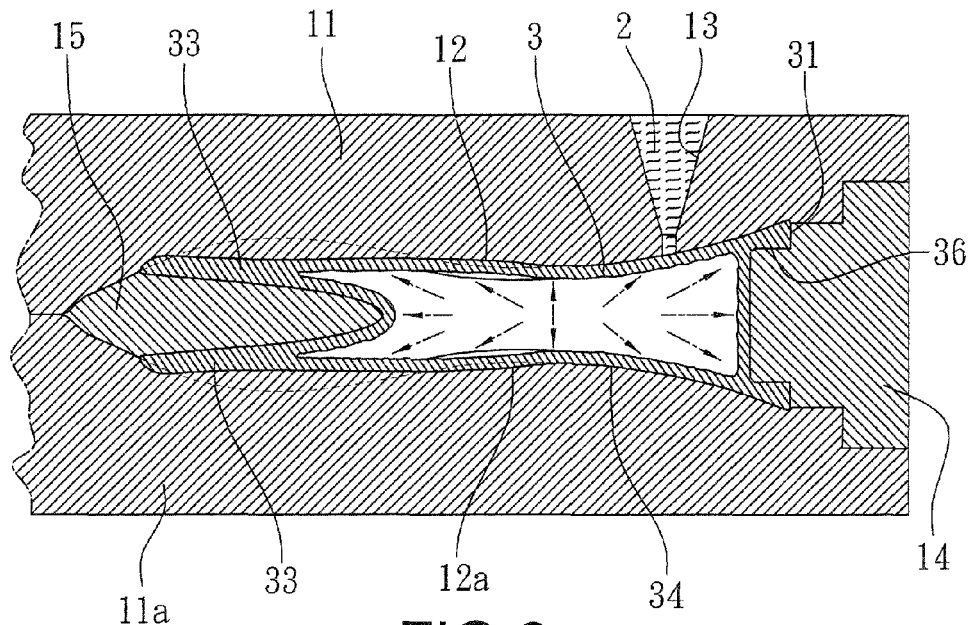
FIG. 6 is a cross-sectional view of FIG. 4, illustrating the molding process.

(B) Injection molding, in which a proper amount of molten plastic 2 is filled into the mold cavities 12, 12a of the mold 1 so assembled as described above through the sprue 13 and the mold 1 is set in rotation in a rotation process (see FIG. 5) to induce a centrifugal force that makes the plastic 2 uniformly sticking to an inside surface of the mold cavities 12, 12a to thereby form a hollow and thus light-weighted shell of tail fin 3 (see FIG. 6). In this step, the amount of molten plastic that is filled into the mold can be properly set in order to control the wall thickness of the tail fin 3 so molded thereby setting the desired strength and weight of a molding of the tail fin 3.

(C) Setting and mold release, in which the mold 1 is opened after the plastic of the shell of the hollow tail fin 3 is cooled and set to a desired extent, in order to carry out de-molding of the molding for removing the plastic molding of the shell of tail fin 3 out of the mold to thereby obtain a final product of tail fin 3 that is a one-piece product showing an aerodynamic and preferably three-dimensional contour (see FIG. 7).

From the above description, it is appreciated that the tail fin structure of wind turbine according to the present invention shows the following advantages:

(1) The tail fin structure of wind turbine according to the present invention, which has an aerodynamic outer contour, is capable to receive winds coming from various direction and shows sensitive and efficient response to the variation of wind direction so as to ensure correct and stable control of the rotor blades of the wind turbine in alignment with the windward direction without being affected by sideways gusts, whereby a wind turbine equipped with the tail fin can be used in a wind field where the wind direction is unstable and turbulences are strong but still maintains the optimum performance.

(2) The tail fin structure according to the present invention shows a light-weighted configuration, which helps reducing the loading applied to a yaw bearing of the yawing joint to thereby realize more sensitive and quicker operation of direction change and also provide equalized weight distribution between the tail fin and the rotor blades of the wind turbine to thereby make the operation of the yaw bearing smooth and stable and service life of the bearing extended.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

We claim:

1. A method for forming tail fin of wind turbine, comprising the following steps:
    a mold making step, in which a mold block is machined to form mold cavity corresponding to a contour of the tail fin, the mold block forming a sprue communicating the mold cavity;
    an injection molding step, in which a preset amount of molten plastic material is filled into the mold cavity through the sprue and the mold is subjected to rotation that induces a centrifugal force to make the molten plastic material uniformly sticking to an inside surface of the mold cavity to form a hollow shell; and
    a setting and mold release step, in which the plastic material of the shell is cooled and set and then the mold is opened to remove the shell out of the mold to provide a plastic molding of the tail fin;
    wherein a tail fin that is a one-piece three-dimensional, hollow and light-weighted configuration is obtained as a tail fin product of excellent aerodynamic performance; wherein the mold is composed of upper and lower mold blocks and wherein the tail fin so molded with the mold has a front end forming a coupling section and a rear end which comprises an erected primary fin member vertically mounted thereto and a secondary side fin member extending from each side of the primary fin member, the tail fin comprising a narrow section behind the coupling section, the narrow section having an outer contour that is continuously and smoothly jointed to the primary fin member and side fin members, the tail fin having a bottom which forms a smooth curved channel at a junction between the two side fin members.

2. The method according to claim 1, wherein the mold comprises an insert that is detachably set in a location corresponding to a coupling section of the tail fin to form a recess in the coupling section and a plurality of slots defined in a circumferential wall of the recess, each of the slots forming therein a fastening hole.

3. The method according to claim 1, wherein the mold comprises an insert that is detachably set at a location below a junction between the primary fin member and the two side fin members of the tail fin in order to form a smooth curved channel in a bottom of the tail fin.

* * * * *